May 22, 1962 S. A. MURDOCK ETAL 3,036,032
GRAFT COPOLYMERS OF MIXTURES OF MONOMERIC BISACRYLAMIDES AND MONOMERIC
ORGANIC SULFONIC ACID COMPOUNDS UPON POLYVINYLLACTAMS, IMPROVED
ACRYLONITRILE POLYMER COMPOSITIONS OBTAINABLE
THEREWITH, AND METHOD OF PREPARATION
Filed Nov. 25, 1957

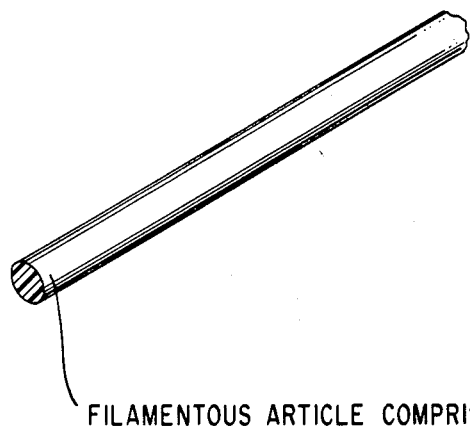

FILAMENTOUS ARTICLE COMPRISED OF AN
ACRYLONITRILE POLYMER HAVING A GRAFT CO-
POLYMER OF A MIXTURE OF AN ALKYLENEBIS-
ACRYLAMIDE AND A MONOMERIC ORGANIC SULFONIC
ACID COMPOUND GRAFT COPOLYMERIZED UPON A
VINYL LACTAM POLYMER INCORPORATED THEREIN.

INVENTORS.
STANLEY A. MURDOCK
CLYDE W. DAVIS
FORREST A. EHLERS
BY *Griswold & Burdick*
ATTORNEYS

3,036,032
GRAFT COPOLYMERS OF MIXTURES OF MONOMERIC BISACRYLAMIDES AND MONOMERIC ORGANIC SULFONIC ACID COMPOUNDS UPON POLYVINYLLACTAMS, IMPROVED ACRYLONITRILE POLYMER COMPOSITIONS OBTAINABLE THEREWITH, AND METHOD OF PREPARATION

Stanley A. Murdock, Concord, Calif., Clyde W. Davis, Williamsburg, Va., and Forrest A. Ehlers, Walnut Creek, Calif., assignors to The Dow Chemical Company, Midland, Mich., a corporation of Delaware
Filed Nov. 25, 1957, Ser. No. 698,739
22 Claims. (Cl. 260—45.5)

The present invention resides in the general field of organic chemistry and contributes specifically to the polymer art, especially with respect to certain cross-linked, water-insoluble graft copolymer compositions and fiber-forming polymer blends obtainable therewith. The invention is, in this way, pertinent to the man-made synthetic textile fiber industry. It is particularly concerned with graft copolymers of mixtures of certain monomeric bisacrylamides in admixture with certain monomeric organic sulfonic acid compounds that are graft copolymerized upon or with polyvinyllactams. Such graft copolymeric products have especial utility as dye-receptive, antistatic and stabilizing additaments for acrylonitrile polymer compositions which advantageously may be of the fiber-forming variety. The invention is also concerned with the compositions that may be obtained by blending the graft copolymers with acrylonitrile polymers, as well as with shaped articles which have been fabricated therefrom, that have significantly enhanced properties and characteristics as regards improvements in and relating to enhanced dye-receptivity, minimizing inherent propensity to accumulate electrostatic charges and an augmented natural stability to various deteriorating influences, including stability against becoming deleteriously influenced and degraded upon exposure to heat at elevated temperatures and light. Within the scope and purview of the invention there is comprehended both the novel and utile graft copolymer and blended polymer compositions of the indicated varieties (as well as various shaped articles fabricated therefrom and comprised thereof) and advantageous methods for their preparation.

It is the main purpose and primary design of the present invention to provide and make available graft copolymers of certain bisacrylamide monomers admixed with certain monomeric organic sulfonic acid compounds upon vinyl lactam polymers that are especially well suited for being incorporated in acrylonitrile polymer compositions, particularly polyacrylonitrile, to serve in the indicated treble capacity of dye-assisting adjuvants, antistatic agents and stabilizing ingredients. It is also a principal aim and concern of the invention to furnish acrylonitrile polymer compositions of the above-indicated and hereinafter more fully delineated type and shaped articles therefrom that have, as intrinsic and distinguishing characteristics, excellent resceptivity of and acceptability for any of a wide variety of dyestuffs; permanently imbued antistatic properties that are unusually good for and not commonly encountered in polymeric materials of the synthetic, essentially hydrophobic varieties of such substances; and efficacious natural stability to heat and light as well as to certain chemical conditions such as alkaline environments.

The blended polymer compositions of the present invention which fulfill such ends and offer corollary advantages and benefits, as will hereinafter be manifest, are, in essence, comprised of an intimate and practically inseparable blend or alloy constitution of (A) an acrylonitrile polymer that contains in the polymer molecule at least about 80 percent by weight of polymerized acrylonitrile which preferably is of the fiber-forming variety and, most advantageously, is polyacrylonitrile and (B) a minor proportion of the beneficial graft copolymeric additament, also a subject of the invention, that functions and serves simultaneously in the treble capacity of a dye-assisting adjuvant, permanent antistatic agent and stabilizer and which is comprised of the graft copolymerized polymerization product of (a) a mixture of monomers consisting of (1) a monomeric alkylene or alkylidene bisacrylamide or bismethacrylamide, as hereinafter more fully delineated and (2) a monomeric organic sulfonic acid compound (including free acid compounds and ester or salt derivatives) that contains a substituent, reactive vinyl or other alkenyl group in its molecule; upon (b) a polymerized N-vinyl lactam, particularly poly-N-vinyl-2-pyrrolidone (PVP). The method of the invention by which such compositions may be made involves incorporating the minor proportions of the polymeric additament in and with the acrylonitrile polymer base by any of several beneficial techniques, hereinafter more thoroughly defined, adapted to suitably accomplish the desired result. The graft copolymers themselves are made by graft copolymerizing the mixture of monomers upon the polyvinyllactam substrate, as hereinafter demonstrated.

Without being limited to or by the specific embodiments and modes of operation set forth, the invention is illustrated in and by the following docent examples wherein, unless otherwise indicated, all parts and percentages are to be taken on a weight basis.

EXAMPLE "A"

A polymeric additament satisfactory for use in practice of the present invention was prepared by charging into a suitable reaction vessel about 5.25 grams of ethylene sulfonic acid; 7.5 grams of N,N'-methylenebisacrylamide; 50 grams of PVP having a Fikentscher K-value of about 60; 0.13 gram of ammonium persulfate; and 200 ml. of water. The charge was mixed together and its pH adjusted to about 8 with sodium hydroxide. The charge was polymerized under an atmosphere of nitrogen at a temperature of about 50° C. with continued agitation for a period of about 16 hours. The monomers were practically completely polymerized with the PVP to make a graft copolymer product which contained about 8 percent of polymerized ethylene sulfonic acid; about 11 percent of polymerized N,N'-methylenebisacrylamide; and about 81 percent of PVP. The graft copolymerized polymeric additament was obtained from the reaction mass as a slightly colored dispersion of extremely fine particles of the graft copolymer.

Polyacrylonitrile fibers containing about 5.4 percent of the above polymeric product were prepared by impregnating filamentary structures that were in aquagel condition after having been salt-spun and wet-stretched in and with an aqueous dispersion of the graft copolymer that contained about 2 percent copolymer solids. The polyacrylonitrile aquagel fiber that was employed had been obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contained about 42 percent of dissolved zinc chloride to form a multiple filament tow. After being spun, the tow bundle of coagulated polyacrylonitrile aquagel fiber was washed substantially free from salt upon being withdrawn from the coagulating bath and then wet-stretched for orientation to a total stretched length that was about thirteen times its original extruded length. The aquagel fiber, which contained about two parts of water for each part of polymer therein, was then passed through the mentioned aqueous impregnating bath of the dispersed graft polymeric additive so as to become impregnated therewith to the indicated extent.

Following the impregnation, the aquagel fiber was irreversible dried at 150° C. to destroy the water-hydrated structure and convert it to a finished fiber form. It was then heat set for five minutes at 150° C. The finally obtained 3 denier fiber product had a tenacity of about 3.5 grams per denier, an elongation of about 33 percent and a wet yield strength of about 0.98 gram per denier. The graft-copolymer-containing acrylonitrile polymer fiber product was found to have excellent natural stability to heat and light as well as against becoming degraded under the influence of aqueous alkaline media at pH levels as high as 10. It was found to be nearly free of propensity to accumulate charges of static electricity upon handling; being about commensurate with viscose rayon fibers in this regard. As is widely appreciated, viscose rayon yarn and fibers are not considered to be afflicted to a troublesome degree with problems due to static.

The graft-copolymer-impregnated fiber product dyed well to deep and level shades of coloration with Calcodur Pink 2BL, a direct type of dyestuff (Colour Index Direct Red 75, formerly Colour Index 353) and Sevron Brilliant Red 4G, a basic dye formerly known as Basic Red 4G (Colour Index Basic Red 14).

The dyeing with Calcodur Pink 2BL was performed at the 4 percent level according to conventional procedure in which the fiber sample was maintained for about one hour at the boil in the dyebath which contained the dyestuff in an amount equal to about 4 percent of the weight of the fiber. The dyebath also contained sodium sulfate in an amount equal to about 15 percent of the weight of the fiber and had a bath-to-fiber weight ratio of about 30:1. After being dyed, the fiber was rinsed in water and dried for about 20 minutes at 80° C. The dye-receptivity of the Calcodur Pink 2BL-dyed fiber was then evaluated spectrophotometrically by measuring the amount of monochromatic light having a wave length of about 520 millimicrons from a standard source that was reflected from the dyed sample. A numerical value on an arbitrarily designated scale from zero to one hundred was thereby obtained. This value represented the relative comparison of the amount of light that was reflected from a standard white tile reflector that had a reflectance value of 316 by extra-polation from the 0–100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The Calcodur Pink 2BL-dyed polyacrylonitrile fibers containing the above-described polymeric additament in accordance with the invention had a reflectance value of about 20. In contrast, ordinary unmodified polyacrylonitrile fibers of the same type generally have a reflectance value of about 130 on the same numerical scale.

The antistatic properties of the graft-copolymer-containing fiber were then determined by measuring the electrical conductance of the fiber product at various humidities. As will be appreciated by those who are skilled in the art, the basis for such a test is that all fibers have a tendency to generate static electricity upon being handled. Only those that are possessed of sufficient electrical conductance to dissipate the charge as quickly as it forms are not hampered by the bothersome effects of static electricity. Thus, a measure of the electrical conductance of a fiber is a good indication of its ability to dissipate static electricity. The conductivities of the various fiber samples tested were found by determining their electrical resistances. Resistance, of course, is the reciprocal quantity of conductivity. In order to permit various fiber samples to be compared on the common basis, the conductivities of the samples tested were actually measured as volume resistivities according to the following formula:

Volume resistivity $$= \frac{(\text{Resistance})(\text{cross-sectional area})}{\text{Path length between electrodes to which sample being tested is attached}}$$

The units of volume resistivity are ohm-cm.$^2$/cm.

Prior to being tested, the copolymer-containing polyacrylonitrile fiber prepared in the indicated manner was scoured for ½ hour at the boil using about 1.0 percent on the weight of the fiber of "Igepal CA–630" (an alkylphenoxypolyoxyethylene ethanol type of non-ionic detergent) and a 30:1 volume:fiber ratio of water. After being scoured, the fiber sample was washed thoroughly with water and dried. The actual resistivity of each sample was determined after the sample being tested was conditioned for seventy-two hours at the particular temperature and relative humidity conditions involved by tautly connecting a web-like sample of the yarn between two electrodes, each of which were 9 centimeters long spaced parallel 13 centimeters apart, and across which there was applied a 900 volt direct current potential. For purposes of comparison, the volume resistivity of cotton, wool and an unmodified polyacrylonitrile fiber (obtained in the same way as the graft-copolymer-containing fiber but without having the copolymeric additament incorporated therein) were also tested in the indicated manner along with the graft-copolymer-containing fiber in accordance with the present invention.

The results are set forth in the following tabulation which indicates the volume resistivities obtained at various relative humidities (RH) at 23° C. of each of the samples tested.

*Table I*

VOLUME RESISTIVITIES OF VARIOUS FIBER SAMPLES COMPARED TO POLYACRYLONITRILE FIBERS IMPREGNATED WITH GRAFT COPOLYMERS OF STYRENE SULFONIC ACID AND N,N'-METHYLENEBISACRYLAMIDE ON PVP

| Sample | Volume resistivity, ohm-cm.$^2$/cm. | | | |
|---|---|---|---|---|
| | 32 percent RH | 47 percent RH | 58 percent RH | 66 percent RH |
| Graft-copolymer-impregnated polyacrylonitrile polymer | ca 5×10$^{10}$ | ca 3×10$^9$ | ca 3×10$^8$ | ca 6×10$^7$ |
| Cotton | 6.4×10$^9$ | 2.7×10$^8$ | 3.0×10$^7$ | 3.3×10$^6$ |
| Wool | 5×10$^{12}$ | 2×10$^{11}$ | 1.9×10$^{10}$ | 3.3×10$^9$ |
| Unmodified polyacrylonitrile fiber | 3×10$^{14}$ | 2.7×10$^{13}$ | 5×10$^{12}$ | 1.2×10$^{12}$ |

As is apparent from the foregoing, the graft-copolymer-containing fiber sample, even after being severely scoured, had electrical conductance properties much superior to ordinary polyacrylonitrile fibers and only slightly poorer than cotton. At the same time, the physical properties of the graft-copolymer-containing fiber were excellent, being about equal to those of unmodified polyacrylonitrile fibers.

Equivalent results are obtained when the foregoing procedure is repeated excepting to impregnate the aquagel fiber with the copolymer additive prior to the stretch-drawing operation on the fiber.

EXAMPLE "B"

Following the general procedure of Example "A," about 10.0 grams of the sodium salt of 2-sulfoethylacrylate; about 7.6 grams of N,N'-methylenebisacrylamide; about 70.6 grams of PVP having a Fikentscher K-value of about 45; about 0.2 gram of ammonium persulfate and about 225 ml. of water were mixed together and the pH of the resulting mixture adjusted to a value of about 3 with HCl. The charge was polymerized for about 18 hours at 50° C. under a nitrogen atmosphere with continued agitation throughout the entire period of polymerization. Practically all of the monomers were converted to a water-insoluble graft copolymer product which was obtained in the form of an aqueous gel-like dispersion. The graft copolymer product contained about 11 percent of the polymerized sodium 2-sulfoethylacrylate monomer; about 8.5 percent of the polymerized N,N'-methylenebisacrylamide monomer; and about 80.5 percent of the PVP. The gelled dispersion, after being put through a Waring Blendor, was applied to a polyacrylonitrile aquagel fiber by a method in accordance with that set forth in the first example using about a 2.5 percent aqueous dispersion of the graft copolymer as an impregnating bath. The impregnated fiber was found to contain about 6.5 percent of the graft-copolymer product. The impregnated fiber product was readily dyeable, had low static properties and excellent stability to heat, light and alkaline media at pH levels as high as 10. When the graft-copolymer-containing fiber product was subjected to ultraviolet light exposure in an Atlas Fadeometer under standard test conditions, no preceptible break in color was observed until after 240 hours of exposure. In comparison, a plain polyacrylonitrile control sample broke after 120 hours under the same conditions.

EXAMPLE "C"

The procedure of Example "B" was essentially duplicated excepting to employ a graft copolymeric polymer additament which was a graft copolymer of styrene sulfonic acid and N,N'-methylenebisacrylamide on PVP prepared from the following polymerization mass which was polymerized under the same conditions and in the same way as that of the preceding example:

Styrene sulfonic acid, sodium salt _____grams__ 10.05
N,N'-methylenebisacrylamide _____do____ 8.42
PVP (Fikentscher K-value 45) _____do____ 73.9
Ammonium persulfate _____do____ 0.2
Water _____ml__ 250

Polyacrylonitrile aquagel fibers, impregnated in the same way as set forth in the preceding examples from a 2 percent aqueous dispersion of the graft copolymer product so as to contain, upon being dried and converted to finished fiber form, about 5.3 percent of the impregnated graft copolymer, based on the weight of the fiber. The graft copolymer-containing fiber product was readily dyeable and had excellent heat and light stability. Even after being severely scoured, the graft copolymer-containing fiber sample had electrical conductance properties much superior to ordinary polyacrylonitrile fibers and only slightly poorer than cotton. At the same time, the physical properties of the graft copolymer-containing fibers were excellent, being about equal to those of the unmodified polyacrylonitrile fiber.

EXAMPLE "D"

About 1.54 grams of N,N'-methylenebisacrylamide; 1.65 grams of allyl taurine; 7.45 grams of PVP having a Fikentscher K-value of about 50; 44.11 grams of water and 0.03 gram of ammonium persulfate were mixed together. The pH of the resulting mixture was about 6. As it is commonly used, the nomenclature "taurine" is commonly employed to designate 2-aminoethanesulfonic acid. The so-prepared polymerization mass was heated under a nitrogen atmosphere with continued agitation for a period of about 16 hours at a temperature of about 50° C., during which time conversion of the monomers to graft copolymer product was substantially complete. A soft, white, water-insoluble, graft-copolymer gel product was thereby obtained which was found to contain about 14 percent of the polymerized N,N'-methylenebisacrylamide; about 15 percent of the allyl taurine; and about 71 percent of PVP. The gelled product was readily dispersed in the aqueous medium to form a uniform dispersion of the graft copolymer by means of a Waring Blendor. When the graft copolymeric polymer additament was impregnated from a 5 percent aqueous dispersion into polyacrylonitrile aquagel fibers according to the procedure described in the foregoing, so as to obtain a fiber product with an impregnated graft-copolymer content of about 11.3 percent, a readily dyeable fiber product was obtained which, when dyed with 4 percent Calcodur Pink 2BL was found to have a reflectance value of about 19. The antistatic characteristics of the graft copolymer-containing fiber product were about commensurate with those of cotton. The resulting fiber product also had excellent heat, light and alkaline stability and good physical properties comparable to those of unmodified polyacrylonitrile fibers of the same type.

EXAMPLE "E"

The procedure of Example "D" was essentially repeated excepting to employ the following charge as the polymerized mass:

Grams
N,N'-methylenebisacrylamide _____ 1.54
Acryloyl taurine, sodium salt _____ 2.01
PVP (Fikentscher K-value 45) _____ 8.30
Ammonium persulfate _____ 0.04
Water _____ 48.10

The charge polymerized to a white, insoluble gel with a substantially complete conversion of the monomeric ingredients to graft copolymer product of about 92 percent. The gel product was dispersed into a uniform aqueous dispersion by a Waring Blendor. Polyacrylonitrile fibers were prepared to contain about 15 percent of the polymeric additament using the general procedure set forth in Example "A" with a 5 percent aqueous dispersion of the graft copolymer product as the impregnating bath for the aquagel fibers. The resulting graft copolymer-containing fiber product had good physical properties, excellent heat, light and alkaline stability and dyed well to deep and level shades with Calcodur Pink 2BL, Calcocid Alizarine Violet, Amacel Scarlet BS and Sevron Brilliant Red 4G. The copolymer-containing fiber product had a reflectance value of about 18 when dyed at the 4 percent level with Calcodur Pink 2BL. The fiber product showed less static susceptibility than viscose rayon yarn.

Results similar to those set forth in the foregoing can also be obtained when other graft copolymers within the scope of the invention are employed and when the polymeric additaments are incorporated in polyacrylonitrile and other acrylonitrile polymer fibers of the well known varieties that contain in the polymer molecule at least about 80 percent by weight of acrylonitrile to provide articles in accordance with the present invention by blending the polymeric additament and the fiber-forming acrylonitrile polymer in a spinning composition or dope prior to its extrusion and to filamentary products by either wet-spinning or dry-spinning techniques. In such instances, incidentally, it may be desirable in order to secure optimum benefit in the practice of the invention to employ relatively larger quantities of the copolymeric additament than when surface impregnation was performed so that the presence of effective quantities of the additament at or near the surface of the article is assured. Excellent results may also be achieved when other poly-N-vinyllactams, including poly-N-vinylcaprolactam, are substituted for or mixed with the PVP in the preparation of the polymeric additaments.

The polymeric additaments that are employed in the practice of the invention, as is indicated in the foregoing, are graft copolymerized products of (a) a mixture of monomers consisting of (1) alkylene or alkylidene bisacrylamides or methacrylamides of the general formula:

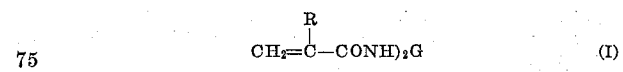

wherein R is hydrogen or a methyl group and G is selected from the group of bivalent radicals consisting of methylene, ethylene, ortho- and para-phenylene, and 1,1-alkylidene radicals that contain from 2 to about 5 carbon atoms; and (2) vinyl or other alkenyl group-containing organic sulfonic acids and derivatives thereof that are selected from the group of such compounds consisting of those represented by the formulae (including mixtures thereof):

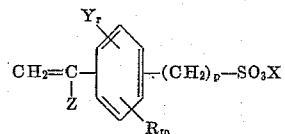

(Aromatic organic sulfonic acid compounds) (II)

$$CH_2=CH-(CH_2)_m-SO_3X \quad (III)$$

(Alkenyl organic sulfonic acid compounds)

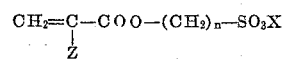

(Sulfoalkylacrylate organic sulfonic acid compounds) (IV)

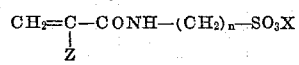

(Acryloyl taurine homolog compounds) (V)

and

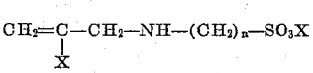

(Allyl taurine homolog compounds) (VI)

all wherein X is hydrogen, and aliphatic hydrocarbon radical containing from 1 to 4 carbon atoms or an alkali metal ion; Y is hydrogen, chlorine or bromine; R is methyl or ethyl; Z is hydrogen or methyl; $m$ has a numerical value in whole number increments from 0 to 2; $n$ has a numerical value of 1 or 2; $p$ is 0 or 1, and $r$ is an integer with a numerical value from 1 to 4; upon ($b$) poly-N-vinyllactam polymers, particularly poly-N-vinyl-2-pyrrolidone, but including other of the poly-N-vinyllactam polymers that are known to the art, such as poly-N-vinyl-5-methyl-2-pyrrolidone, poly-N-vinylpiperidone, poly-N-vinylcaprolactam and others of those which have been described and are involved in U.S. Patent No. 2,265,450. While it is sometimes desirable to utilize vinyl lactam polymers having Fikentscher K-values from about 40 to 60 or so as substrate polymers for the graft copolymeric additament products, such limitation is not absolute or of especial criticality. It is generally possible to obtain satisfactory graft copolymers when either lower or higher K-value polyvinyllactams are employed.

The acrylamide monomers that are employed in the practice of the invention may be obtained by distinctly different methods, depending upon their particular chemical constitution. Thus, alkylidene bisacrylamides may be prepared from aldehydes and acrylonitrile according to the following illustrative equation:

$$H_2O+2CH_2=CHCN+RCHO \rightarrow (CH_2=CHCONH)_2CHR$$

whereas alkylene bisacrylamides are ordinarily obtainable from diamines and acrylic acid according to the following illustrative reaction:

$$2CH_2=CHCOOH+H_2NGNH_2 \rightarrow (CH_2=CHCONH)_2G+2H_2O$$

Of course, bismethacrylamide monomers may be manufactured in analogous ways. Typical of the various bis-acrylamide and bismethacrylamide monomers that may be satisfactorily employed for the preparation of the graft copolymeric additaments of the invention are the following (grouped according to the type of bivalent linkage in their structures).

Alkylene linked monomers:
    Methylene-N,N'-bisacrylamide
    Methylene-N,N'-bismethacrylamide
    Ethylene-N,N'-bisacrylamide
    Ethylene-N,N'-bismethacrylamide Phenylene linked monomers:
    Ortho-phenylene-N,N'-bisacrylamide
    Ortho-phenylene-N,N'-bismethacrylamide
    Para-phenylene-N,N'-bisacrylamide
    Para-phenylene-N,N'-bismethacrylamide Alkylidene linked monomers:
    Ethylidene-N,N'-bisacrylamide
    Ethylidene-N,N'-bismethacrylamide
    Propylidene-N,N'-bisacrylamide
    Butylidene-N,N'-bisacrylamide
    Isobutylidene-N,N'-bismethacrylamide
    Pentylidene-N,N'-bisacrylamide Besides those specifically illustrated, other organic sulfonic acids may also be utilized for the preparation of the water-insoluble polymeric additaments of the present invention, such by way of illustration, as those which are set forth in the disclosure of United States Letters Patent No. 2,527,300. In addition to the sulfonic acid monomers specifically described in the foregoing examples, others that may advantageously be employed in the practice of the present invention include such organic sulfonic acids as 2-propene sulfonic acid; sodium para-vinylbenzene sulfonate; 2- and/or 3-sulfopropyl acrylate; sulfoacrylic acid; sodium vinyl toluene sulfonate; potassium ortho-chlorostyrene sulfonate; 2 - hydroxy-3-sulfopropyl acrylate, sodium salt; sodium 3-allyloxy-2-hydroxypropane sulfonate; 4-sulfophenyl acrylate, sodium salt; N-allyl imino di-(2-ethane sulfonic acid); and the like.[1]

The graft copolymeric additaments that are employed in the practice of the invention may generally be prepared by conventional methods of polymerization, including those which have been demonstrated in the foregoing illustrative examples. In addition to the usual catalysts, including persulfates, organic and inorganic peroxides and azo type catalysts, the graft-copolymers may oftentimes be polymerized under the influence of high energy radiation such as by means of X-rays and the like, or simply by heating and evaporating the monomer-containing polymerization mixture. The graft-copolymers may be prepared in both aqueous and organic solvent vehicles, using temperatures for the desired polymerization that may vary from about room temperature to the boiling point of the polymerization mixture. It is ordinarily satisfactory to conduct the reaction at a temperature of about 50 to 80 or 100° C. Usually, depending upon the specific factors that may be involved, the copolymerization may be accomplished satisfactorily within a time period of about 10 to 60 hours.

The compositions of the graft copolymerized polymeric additament can vary within rather wide limits. Advantageously, the content of the poly-N-vinyllactam upon which the monomeric constituents are graft copolymerized is between about 10 and 90 percent, more advantageously between about 20 and 80 percent, of the weight of the graft copolymerized product with the content of either monomeric constituent being between about 10 and 90, more advantageously, from about 30 to 70 mole percent of the polymerized monomer substituents in the graft copolymerized product. It may frequently be desirable for the monomeric constituents that are polymerized to be employed in nearly equivalent or about commensurate or equal molar proportions in the preparation of the graft copolymeric polymeric additament and for the quantity of the vinyl lactam polymer substrate to be at least half of the constitution of the graft copolymer product.

The polymerization system that is employed for the preparation of the graft copolymers employed in the

---

[1] See Appendix for others.

present invention may consist of as much as 50 percent by weight of the monomers and poly-N-vinyllactam to be graft-copolymerized in the aqueous medium. The amount of monomeric material that is provided in the copolymerization system may be influenced somewhat by the manner in which it is intended to incorporate the product in the synthetic polymer compositions in order to provide the compositions of the invention.

If, for example, it is intended to incorporate the graft copolymer products by blending into a fiber-forming composition prior to its fabrication into shaped articles, the copolymerization system may, if desired contain about equal proportions by weight of the charged graft copolymerizable materials and the polymerization medium which preferably is miscible with and tolerable in the spinning solution solvent being used. In such cases, the graft copolymer product may ordinarily be obtained as an easily dispersed gel that, after being dried and isolated from unreacted monomer, may readily be directly incorporated in the fiber-forming composition.

If the incorporation of the graft copolymeric additament in a fiber-forming composition is to be achieved by impregnation therewith of an already-formed shaped article of the composition; it may be desirable to effect the polymerization so as to directly form the graft copolymerization system as a suitable applicating emulsion or suspension of the graft copolymeric product. For such purposes, the polymerization system may be prepared to contain as little as 2–10 percent by weight of the graft-copolymerizing ingredients. Preferably, such a graft copolymerization may be conducted under the influence of vigorous agitation to facilitate preparation of an emulsified or thoroughly dispersed product. It may also be beneficial under such circumstances to incorporate a dispersant or emulsifying agent in the polymerization system to facilitate obtaining a stable and homogeneous emulsified product. Such a method for preparing the graft copolymeric additaments that are employed in the present invention may be especially appropriate when they are intended to be applied to acrylonitrile polymer fibers and the like that are derived from aquagels in the course of their manufacture, such as the acrylonitrile polymer fibers that are wet spun from aqueous saline solutions of the fiber-forming polymer.

In such instances, as has been demonstrated, the emulsified, water-insoluble, graft copolymeric additaments may be impregnated into the fiber while it is in a swollen or gel condition, as an acrylonitrile polymer fiber in an aquagel condition, in order to obtain the desired graft-copolymer-containing product.

In this connection, when it is desired to blend the graft copolymeric additament in a synthetic polymer fiber-forming solution prior to its extrusion, such as an aqueous saline acrylonitrile polymer solution, the water-insoluble copolymer may be physically reduced by comminution to a sufficiently fine state to permit its dispersion in spinnable condition throughout the blended spinning solution in the event that it is otherwise insoluble in the solvent. While this may be accomplished by diverse techniques, it is generally advantageous to comminute the polymeric additament in the presence of the non-dissolving solvent, such as an aqueous saline polyacrylonitrile solvent, to form a stable suspension that may be more conveniently blended with the spinning solution of the synthetic polymer, such as an aqueous saline acrylonitrile polymer spinning solution. Thus, if the aqueous, saline polyacrylonitrile solvent that is being employed in an aqueous solution of zinc chloride or its equivalent that contains at least about 55 percent and preferably about 60 percent by weight of dissolved zinc chloride, it may be advantageous to comminute the graft copolymeric additament while it is in a mixture with the saline solvent solution that contains between about 5 and 10 percent by weight of the copolymer. Analogous procedures may be employed when other solvents are involved. Ball or rod mills or other attrition apparatus may be employed beneficially for the comminution. It is generally beneficial under such circumstances to avoid the use of balls or rods that are made of metal since they may contaminate the product, especially when aqueous saline solvents are utilized. Porcelain or other ceramic parts may usually be employed with advantage. A stable suspension of the graft copolymeric additament in the acrylonitrile polymer solvent that is suitable for blending in the spinning solution of the acrylonitrile polymer to provide a spinnable composition may usually be obtained by milling the mixture of polymeric additament and solvent for an extended period that may exceed 100 hours. The suspension that is thereby obtained may then be directly blended in the proper proportions with the acrylonitrile polymer spinning solution to provide a composition in accordance with the present invention.

If desired, the graft-copolymer-containing acrylonitrile polymer compositions may comprise as much as 20 or more percent by weight of the graft copolymeric additament, based on the weight of the composition. Usually, however, suitable properties and characteristics and better fiber-forming properties in a given composition may be achieved when lesser proportions of the polymeric additament are incorporated therein. An appreciable improvement in dye-receptivity, anti-static properties and stability may frequently be obtained when a quantity of the graft copolymeric additament that is less than 0.5 percent by weight is employed. Advantageously, an amount between about 2 and 15 percent by weight of the polymeric additament may thus be utilized in the composition. Greater advantages may often accrue when the amount of the polymeric additament that is incorporated in the composition is not in excess of about 10 percent by weight, based on the weight of the composition.

As has been indicated, the graft copolymeric additaments may be incorporated in the acrylonitrile polymer compositions according to various techniques. Thus, for example, the polymeric additament and the acrylonitrile polymer may be directly blended in order to provide the composition which, incidentally, may be used for any desired fabrication purpose in addition to fiber-forming and the like. Beneficially, the polymers may be comminuted, either separately or in combination, before being intimately blended together by mechanical or other means. The blended polymers may be prepared into suitable fiber-forming systems by dispersing them in a suitable liquid medium. Or, the compositions may be provided in fiber-forming sytem by sequentially dispersing the polymers in any desired order in a suitable medium, as by incorporating the graft-copolymeric additament in a prepared acrylonitrile polymer spinning solution, dope or the like. As is obivous, the polymeric additaments employed in the practice of the present invention are ordinarily insoluble, despite the fact that they are readily dispersible in most solvents.

As is evident from the illustrative examples heretofore included, a highly advantageous technique for providing the compositions, particularly when acrylonitrile polymer fiber products are involved, is to apply or impregnate the graft copolymeric additament from an aqueous dispersion thereof to a shaped acrylonitrile polymer article that is in an aquagel condition in a manner similar and analogous to that employed for the impregnation of vinyl lactam polymers as described in the disclosure contained in the copending application of George W. Stanton, Theodore B. Lefferdink, Richard W. Meikle and Mary J. Charlesworth for a "Method and Composition for Rendering Polyacrylonitrile Readily Dyeable" having Serial No. 333,385, which was filed on January 26, 1953, now abandoned. Thus, an acrylonitrile polymer filamentary article that has been spun from aqueous saline spinning solution may be conveniently passed, after its coagulation and while it is in an aquagel condition, through a water bath containing a dispersed graft copolymeric additament in order to impregnate the filament with the graft-copolymer and provide a composition and an article in accordance with the invention. In addition, in situ polymerization techniques may be employed to provide the graft copolymeric additament in the fiber product. Thus, the compositions may be made by impregnating an acrylonitrile polymer, such as a shaped article in aquagel or other swollen condition, with the unpolymerized monomers and the vinyl lactam polymer substrate and graft copolymerizing them therein by means of radiation, dry heat or steam with or without other catalyzing influence.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be manufactured from synthetic polymeric materials. It is frequently desirable to employ concentrated solutions of salts of mixtures of salts as the dispersing or dissolving media for such purposes. Such solutions may, as has been indicated, contain at least about 55 percent by weight, based on the weight of the solution, of zinc chloride or other known saline solvents for the polymer. Acrylonitrile polymer fiber products that are spun from saline fiber-forming systems may, by way of further illustration, be coagulated in more dilute saline solutions of a like or similar nature and may then be processed after coagulation according to conventional techniques of washing, stretching, drying, finishing and the like with the modification of the present invention being accomplished prior or subsequent to the spinning as may be desired and suitable in particular instances.

The acrylonitrile polymer fiber products in accordance with the present invention (one of which is schematically illustrated in the sole FIGURE of the accompanying drawing) have excellent physical properties and other desirable characteristics for a textile material and have a high capacity for and are readily and saisfactorily dyeable to deep and level shades with any of a wide variety of dyestuffs. For example, they may be easily and successfully dyed according to conventional procedures using acid, vat, acetate, direct, naphthol and sulfur dyes. Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index 11110— also known as Amacel Scarlet BS, and having American Prototype Number 244), Calcodur Pink 2BL (Colour Index 353, also more recently, colour Index Direct Red 75), Naphthol ASMX (Colour Index 35527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing, polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38). Niagara Blue NR (Colour Index Direct Blue 1511 and Erie Fast Scarlet 4BA (Colour Index Direct Red 24); such acid dyes as Anthraquinone Green GN (Colour Index Acid Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 25); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Red 13), Artieil Direct Red 3BP and Celanthrene Red 3BN Conc. (Both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-Chloro-4-nitroaniline, an azoic dye; such sulfur dyes as Katigen Brilliant Blue GGS High Conc. (Colour Index Sulf. Blue 9) and Indo Carbon GLGS (Colour Index Sulf. Blue 6); and various premetallized dyestuffs.

The dyed products are generally lightfast and stable to heat and are well imbued with a resistance to crocking. In addition, the dyed products exhibit good washfastness and retain the dye-assisting polymeric additament in a substantially permanent manner despite repeated exposure and subjection to washing, laundering and dry cleaning treatments.

APPENDIX

Representative of the various monomeric organic sulfonic acid compounds that may be employed satisfactorily in the practice of the present invention are those set forth in the following listing, wherein they are grouped according to the several designated types. The list, by no means exhaustive, includes species not mentioned in the foregoing.

Aromatic alkenyl group-containing sulfonic acid compounds (Formula II):
    Para-styrene sulfonic acid
    Ortho-styrene sulfonic acid
    Para-isopropenyl benzene sulfonic acid
    Para-vinyl benzyl sulfonic acid
    Ortho-isopropenyl benzyl sulfonic acid
    Sodium para-styrene sulfonate
    Potassium ortho-styrene sulfonate
    Methyl para-styrene sulfonate
    Ethyl para-vinyl benzyl sulfonate
    Ortho vinyl benzene sulfonic acid
    Isopropyl ortho-isopropenyl benzene sulfonate
    n-Butyl ortho-styrene sulfonate
    Tertiary butyl para-styrene sulfonate
    2-chloro-4-vinyl benzene sulfonic acid
    4-bromo-2-isopropenyl benzene sulfonic acid
    3-vinyl toluene-6-sulfonic acid, sodium salt
    2-ethyl-4-vinyl-benzene sulfonic acid
    2,3-dichloro-4-vinyl benzene sulfonic acid
    2,3,5-tribromo-4-vinyl benzene sulfonic acid
    2-chloro-3-vinyl-toluene-6-sulfonic acid
    2,3-diethyl-4-vinyl-benzyl sulfonate, sodium salt Alkenyl sulfonic acid compounds (Formula III):
    Ethylene sulfonic acid
    Sodium ethylene sulfonate
    Potassium ethylene sulfonate
    Methyl ethylene sulfonate
    Isopropyl ethylene sulfonate
    1-propene 3-sulfonic acid
    1-propene 1-sulfonic acid, sodium salt
    1-propene 2-sulfonic acid, ethyl ester
    1-butylene-4-sulfonic acid, n-butyl ester
    1-butylene 3-sulfonic acid
    Tertiary butylene sulfonic acid

13

Sulfoalkylacrylate compounds (Formula IV):
  Sulfomethylacrylate
  2-sulfoethylacrylate
  Sulfomethylmethacrylate, sodium salt
  2-sulfoethylmethacrylate, methyl ester
  2-sulfoethylmethacrylate, potassium salt Acryloyl taurine and homologous compounds (Formula V):
  N-acryloyl taurine
  N-acryloyl taurine, sodium salt
  N-methacryloyl taurine, methyl ester
  N-methacryloyl taurine, potassium salt
  N-acryloyl taurine, ethyl ester
  N-acryloyl-aminomethane sulfonic acid
  N-methacryloyl-aminomethane sulfonic acid, sodium salt
  Methyl N-methacryloyl-aminomethane sulfonate Allyl taurine and homologous compounds (Formula VI):
  Allyl taurine
  Allyl taurine, sodium salt
  Allyl taurine, potassium salt
  Methallyl taurine
  Methallyl taurine, methyl ester
  Methallyl taurine, isopropyl ester
  N-allyl-aminomethane sulfonic acid
  Sodium N-allyl-aminomethane sulfonate
  Lithium N-methallyl-aminomethane sulfonate
  n-Butyl N-allyl-aminomethane sulfonate

What is claimed is:

1. Composition comprising a major proportion of at least about 80 percent by weight, based on the weight of the composition, of (A) a fiber forming polymer of an ethylenically unsaturated monomeric material containing at least about 80 percent by weight of acrylonitrile and (B) a minor proportion of up to about 20 percent by weight, based on the weight of the composition, of a graft copolymer of (a) from about 10 to 90 percent by weight, based on the weight of the graft copolymer, of a mixture of monomers consisting of (1) from about 10 to 90 mole percent of an acrylamide monomer of the formula:

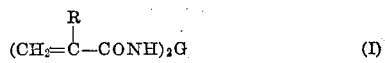

wherein R is selected from the group consisting of hydrogen and methyl and G is a bivalent radical selected from the group consisting of methylene, ethylene, orthophenylene, para-phenylene, and 1,1-alkylidene radicals containing from 2 to 5 carbon atoms; and (2) from about 90 to 10 mole percent of at least one alkenyl group-containing organic sulfonic acid compound selected from the group consisting of those represented by the formulae:

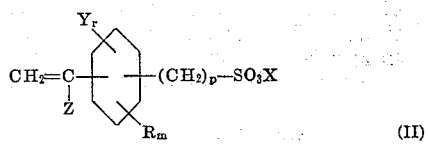

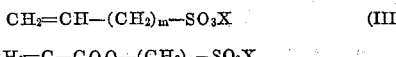

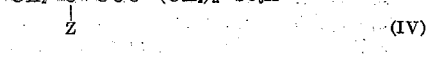

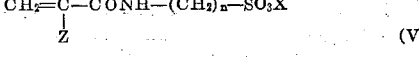

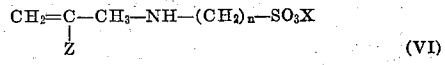

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consist-

14 ing of hydrogen and methyl; $m$ is an integer from 0 to 2; $n$ is an integer from 1 to 2; $p$ is an integer from 0 to 1; and $r$ is an integer from 1 to 4; and (b) from about 90 to 10 percent by weight, based on the weight of the graft copolymer, of an N-vinyl lactam polymer.

2. The composition of claim 1 containing between about 0.5 and 15 percent by weight, based on the weight of the composition, of said graft copolymer.

3. The composition of claim 1 containing between about 2 and 10 percent by weight, based on the weight of the composition, of said graft copolymer.

4. The composition of claim 1, wherein the content of said poly-N-vinyl lactam with which said monomeric constituents are graft copolymerized is at least about 50 percent by weight, based on the weight of said graft copolymer.

5. A composition as set forth in claim 4, wherein said graft copolymer is comprised of between about 20 and 80 percent by weight of said poly-N-vinyl lactam with the balance of the weight of said graft copolymer being comprised of about equal molar proportions of components (1) and (2).

6. The composition of claim 1, wherein component (B) is a graft copolymer of N,N'-methylenebisacrylamide and ethylene sulfonic acid with poly-N-vinyl-2-pyrrolidone.

7. The composition of claim 1, wherein component (B) is a graft copolymer of N,N'-methylenebisacrylamide and sodium styrene sulfonate with poly-N-vinyl-2-pyrrolidone.

8. The composition of claim 1, wherein component (B) is a graft copolymer of N,N'-methylenebisacrylamide and the sodium salt of acryloyl taurine with poly-N-vinyl-2-pyrrolidone.

9. The composition of claim 1, wherein component (B) is a graft copolymer of N,N'-methylenebisacrylamide and the sodium salt of 2-sulfoethylacrylate with poly-N-vinyl-2-pyrrolidone.

10. The composition of claim 1, wherein component (B) is a graft copolymer of N,N'-methylenebisacrylamide and the sodium salt of allyl taurine with poly-N-vinyl-2-pyrrolidone.

11. The composition of claim 1, wherein the acrylonitrile polymer is polyacrylonitrile.

12. The composition of claim 1 dissolved in a solvent for polyacrylonitrile.

13. A filamentary shaped article comprised of a composition that is set forth in claim 1.

14. Method for the preparation of a dye-receptive, antistatic, stable to light and heat, synthetic, hydrophobic polymer composition which comprises immersing an aquagel of a fiber forming polymer of an ethylenically unsaturated monomeric material containing at least about 80 percent by weight of acrylonitrile in the form of a shaped article into a dispersion of a graft copolymer of (a) from about 10 to 90 percent by weight, based on the weight of the graft copolymer, of (a) a mixture of monomers consisting of (1) from about 10 to 90 mole percent of an acrylamide monomer of the formula:

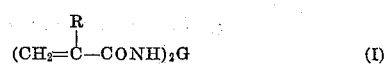

wherein R is selected from the group consisting of hydrogen and methyl and G is a bivalent radical selected from the group consisting of methylene, ethylene, orthophenylene, para-phenylene, and 1,1-alkylidene radicals containing from 2 to 5 carbon atoms; and (2) from about 90 to 10 mole percent of at least one alkenyl group-containing organic sulfonic acid compound selected from the group consisting of those of the formulae:

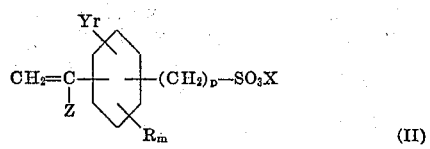

$$CH_2=CH-(CH_2)_m-SO_3X \qquad (III)$$

$$CH_2=\underset{Z}{\underset{|}{C}}-COO-(CH_2)_n-SO_3X \qquad (IV)$$

$$CH_2=\underset{Z}{\underset{|}{C}}-CONH-(CH_2)_n-SO_3X \qquad (V)$$

$$CH_2=\underset{Z}{\underset{|}{C}}-CH_2-NH-(CH_2)_n-SO_3X \qquad (VI)$$

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; with ($b$) between about 90 and 10 percent by weight, based on the weight of the graft copolymer, of a poly-N-vinyl lactam, until between about 0.5 and 20 percent by weight of said graft copolymer, based on the weight of the resulting dry composition weight, is incorporated in said aquagel; and drying said graft copolymer-containing aquagel to convert it from the aquagel condition to a finished shaped article form.

15. The method of claim 14, wherein said acrylonitrile polymer is polyacrylonitrile.

16. The method of claim 14, whrein said poly-N-vinyl lactam is poly-N-vinyl-2-pyrrolidone.

17. The method of claim 14, wherein said shaped article is prepared in filamentary form.

18. A graft copolymer comprising between about 10 and 90 percent by weight of ($a$) a mixture of monomers consisting of (1) from about 10 to 90 mole percent of an acrylamide monomer of the formula:

$$(CH_2=\underset{|}{\overset{R}{C}}-CONH)_2G \qquad (I)$$

wherein R is selected from the group consisting of hydrogen and methyl and G is a bivalent radical selected from the group consisting of methylene, ethylene, ortho-phenylene, para-phenylene, and 1,1-alkylidene radicals containing from 2 to 5 carbon atoms; and (2) from about 90 to 10 mole percent of at least one alkenyl group-containing organic sulfonic acid compound selected from the group of those represented by the formulae:

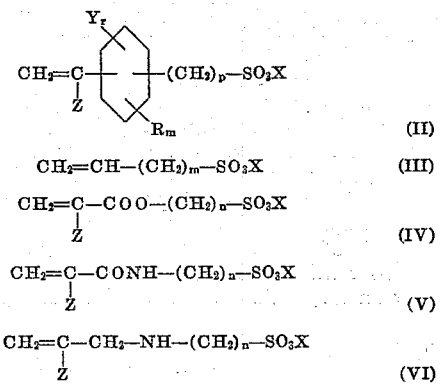

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and ($b$) from about 90 to 10 percent by weight of an N-vinyl lactam polymer.

19. The graft copolymer of claim 18, containing from about 20 to 80 percent of about equal molar proportions of said mixture of monomers graft copolymerized with from about 80 to 20 percent of said poly-N-vinyl lactam.

20. The graft copolymer of claim 18, wherein said mixture of monomers consists of (1) from about 30 to 70 mole percent of said acrylamide monomer of Formula I and (2) from about 70 to 30 mole percent of at least one of said organic sulfonic acid compounds selected from the group consisting of those represented by the Formulae II, III, IV, V and VI.

21. The graft copolymer of claim 18, wherein said vinyl lactam polymer is poly-N-vinyl-2-pyrrolidone.

22. Method for the preparation of a graft copolymer which comprises polymerizing with from about 90 to 10 percent by weight, based on the weight of the resulting graft copolymer, of an N-vinyl lactam polymer, between about 10 and 90 percent by weight of a mixture of monomers consisting of (1) from about 10 to 90 mole percent of an acrylamide monomer of the formula:

$$(CH_2=\underset{|}{\overset{R}{C}}-CONH)_2G \qquad (I)$$

wherein R is selected from the group consisting of hydrogen and methyl and G is a bivalent radical selected from the group consisting of methylene, ethylene, ortho-phenylene, para-phenylene, and 1,1-alkylidene radicals containing from 2 to 5 carbon atoms; and ($b$) from about 90 to 10 mole percent of at least one organic sulfonic acid compound selected from at least one member of the group consisting of those represented by the formulae:

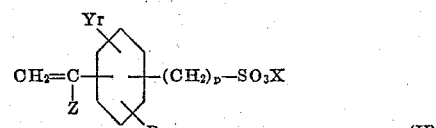

$$CH_2=CH-(CH_2)_m-SO_3X \qquad (III)$$

$$CH_2=\underset{Z}{\underset{|}{C}}-COO-(CH_2)_n-SO_3X \qquad (IV)$$

$$CH_2=\underset{Z}{\underset{|}{C}}-CONH-(CH_2)_n-SO_3X \qquad (V)$$

$$CH_2=\underset{Z}{\underset{|}{C}}-CH_2-NH-(CH_2)_n-SO_3X \qquad (VI)$$

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4.

References Cited in the file of this patent

UNITED STATES PATENTS

| | | |
|---|---|---|
| 2,417,312 | MacGregor | Mar. 11, 1947 |
| 2,418,696 | Cameron et al. | Apr. 8, 1947 |
| 2,614,289 | Cresswell et al. | Oct. 21, 1952 |
| 2,643,990 | Ham | June 30, 1953 |
| 2,735,831 | Coover | Feb. 21, 1956 |
| 2,776,270 | Coover et al. | Jan. 1, 1957 |
| 2,776,271 | Coover et al. | Jan. 1, 1957 |
| 2,790,783 | Coover | Apr. 30, 1957 |
| 2,821,519 | Glickman | Jan. 28, 1958 |
| 2,861,101 | Tousignant et al. | Nov. 18, 1958 |